United States Patent
Kim et al.

(10) Patent No.: US 12,019,679 B2
(45) Date of Patent: Jun. 25, 2024

(54) METHOD AND APPARATUS FOR SEARCHING VIDEO SECTION USING NATURAL LANGUAGE

(71) Applicant: ELECTRONICS AND TELECOMMUNICATIONS RESEARCH INSTITUTE, Daejeon (KR)

(72) Inventors: Jong Hee Kim, Daejeon (KR); Hyung Il Kim, Daejeon (KR); Jin Young Moon, Daejeon (KR); Je Seok Ham, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/891,486

(22) Filed: Aug. 19, 2022

(65) Prior Publication Data

US 2023/0325438 A1    Oct. 12, 2023

(30) Foreign Application Priority Data

Apr. 12, 2022   (KR) .................. 10-2022-0044952

(51) Int. Cl.
*G06F 16/00*  (2019.01)
*G06F 16/735*  (2019.01)
*G06F 16/738*  (2019.01)
*G06F 16/78*  (2019.01)
*G06F 40/279*  (2020.01)

(52) U.S. Cl.
CPC ........ *G06F 16/7867* (2019.01); *G06F 16/735* (2019.01); *G06F 16/738* (2019.01); *G06F 40/279* (2020.01)

(58) Field of Classification Search
None
See application file for complete search history.

(56) References Cited

U.S. PATENT DOCUMENTS 9,535,990 B2    1/2017   Skolicki
10,452,713 B2   10/2019  Liu et al.
(Continued)

FOREIGN PATENT DOCUMENTS

KR    10-2008-0052173 A    6/2008
KR    10-1571240 B1        11/2015
(Continued)

*Primary Examiner* — Tuankhanh D Phan
(74) *Attorney, Agent, or Firm* — LRK PATENT LAW FIRM

(57) ABSTRACT

Disclosed herein are a method and apparatus for searching for a video section by using a natural language. The method for searching for a video section includes: extracting keywords from a natural language sentence, when the natural language sentence is input; determining whether or not the extracted keywords are included in predefined context information; and deriving and providing a final search result. In addition, when the extracted keywords are included in the predefined context information, a search result is derived by performing a first method, and when the extracted keywords are not included in the predefined context information, a search result is derived by performing a second method.

12 Claims, 12 Drawing Sheets

(56) References Cited

U.S. PATENT DOCUMENTS

| | | | |
|---|---|---|---|
| 11,025,880 B2 | 6/2021 | Jang et al. | |
| 2010/0250497 A1* | 9/2010 | Redlich | G06Q 10/06 |
| | | | 707/661 |
| 2018/0285744 A1 | 10/2018 | Kang et al. | |
| 2021/0133268 A1* | 5/2021 | Ghorbani | G06F 16/90332 |

FOREIGN PATENT DOCUMENTS

| | | |
|---|---|---|
| KR | 10-2148021 B1 | 8/2020 |
| KR | 10-2171657 B1 | 10/2020 |
| KR | 10-2267403 B1 | 6/2021 |

* cited by examiner

METHOD AND APPARATUS FOR SEARCHING VIDEO SECTION USING NATURAL LANGUAGE

CROSS REFERENCE TO RELATED APPLICATION

The present application claims priority to Korean patent application 10-2022-0044952 filed on Apr. 12, 2022, the entire contents of which are incorporated herein for all purposes by this reference.

BACKGROUND OF THE INVENTION

1. Field of the Invention

The present disclosure relates a method and apparatus for searching for a video section using natural language, and more particularly, to a technique of searching for a specific section of video using a natural language sentence.

2. Description of Related Art

Conventionally, in searching for a section in video, there are mainly two methods: one method uses predefined context information, and the other method uses natural language. The first method searches for sections corresponding to pieces of predefined context information and is performed, for example, by searching for a section in which a predefined object or face appears or a section which has a predefined attribute. As this method uses an artificial intelligence model specially trained with predefined context information, it has high accuracy but a disadvantage of not being capable of dealing with new context information and of requiring additional artificial intelligence model learning for reaction. Furthermore, when there are many pieces of predefined context information, context information desired by a user is selected after a long time, and the relation between different pieces of context information is hard to set.

The second method searches for a section corresponding to whatever sentence a user inputs, and as for its advantages, context information and a relation between different pieces of information are conveniently input, and operation is possible even when context information is not predefined. However, as for its disadvantage, compared with the first method, the second method is not specialized in each piece of context information so that it has low accuracy.

SUMMARY

A technical object of the present disclosure is to provide a method and apparatus for efficiently searching for a video section, while solving the disadvantage of an existing video section search technique.

Another technical object of the present disclosure is to provide a method and apparatus for searching for a video section with high accuracy based on natural language.

Another technical object of the present disclosure is to provide a method and apparatus for searching for a video section, while making it convenient to input context information in a method for searching for a video section.

The technical objects of the present disclosure are not limited to the above-mentioned technical objects, and other technical objects that are not mentioned will be clearly understood by those skilled in the art through the following descriptions.

According to an embodiment of the present disclosure, a method for searching for a video section may include: extracting keywords from a natural language sentence, when the natural language sentence is input; determining whether or not the extracted keywords are included in predefined context information; and deriving and providing a final search result, wherein, when the extracted keywords are included in the predefined context information, a search result may be derived by performing a first method, and when the extracted keywords are not included in the predefined context information, a search result may be derived by performing a second method.

In addition, the extracting of the keywords may include extracting a relational operator between keywords.

In addition, the first method may use one or more artificial intelligence learning models according to a type of context information.

In addition, after determining whether or not the extracted keywords are included in predefined context information, at least one of the first method, the second method or combination thereof may be performed.

In addition, the providing of the final search result may derive a final search result through a process of finally merging the search result after at least one of the first method, the second method or combination thereof is performed.

In addition, the merging of the search result may merge the search result by considering the relational operator between keywords.

In addition, when the extracted keywords belong to predefined context information, corresponding predefined models may be derived together.

In addition, the predefined models may be enabled when context information belonging to each model is given.

In addition, when the second method is performed, learning a keyword, for which the second method is performed, as a predefined keyword may be included.

In addition, when the learned keyword is input into a sentence analyzer again, the first method may be performed.

In addition, the predefined keyword may be a keyword that is stored as a predefined keyword in an internal memory. As another alternative, the predefined keyword may be a predefined keyword that is provided by an external device.

In addition, the providing of the search result may include providing a search result by prioritizing search results in order of accuracy.

In addition, according to an embodiment of the present disclosure, a device for searching for a video section may include: a sentence analyzer configured to extract keywords from an input sentence; a context information checking unit configured to check whether or not the extracted keywords are included in predefined context information; and a derivation unit configured to derive a final search result, wherein, when the extracted keywords are included in the predefined context information, a first method may be performed, and when the extracted keywords are not included in the predefined context information, a second method may be performed.

In addition, the sentence analyzer may extract a relational operator between keywords.

In addition, the context information checking unit may perform at least one of the first method, the second method or combination thereof.

In addition, the derivation unit may derive a final search result through a process of finally merging after at least one of the first method, the second method or combination thereof is performed.

In addition, the merging of the search result may merge the search result by considering a relation between the keywords.

In addition, when the second method is performed, a keyword learning unit may be included which enables learning a keyword, for which the second method is performed, as a predefined keyword.

In addition, the derivation unit may derive a search result by prioritizing search results in order of accuracy.

According to the present disclosure, accuracy of searching for a video section may be improved by using both a first method and a second method.

According to the present disclosure, inputting context information for video section search may become more convenient by using both a first method and a second method.

According to the present disclosure, a disadvantage of the related art may be solved, and an advantage of a first method and a second method may be taken.

Effects obtained in the present disclosure are not limited to the above-mentioned effects, and other effects not mentioned above may be clearly understood by those skilled in the art from the following description.

DETAILED DESCRIPTION

Figure 1A:
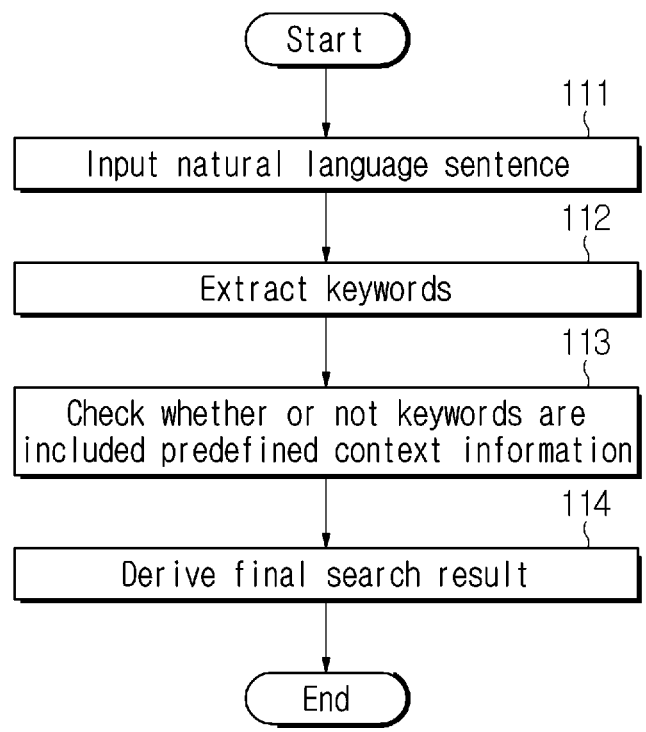
FIG. 1A and FIG. 1B are flowcharts illustrating methods for searching for a video section according to an embodiment of the present disclosure.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Also, in the drawings, parts not related to the description of the present disclosure are omitted, and like parts are designated by like reference numerals.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, the terms such as first and second are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, components that are distinguished from each other are intended to clearly illustrate respective features, which does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, embodiments that include other components in addition to the components described in the various embodiments are also included in the scope of the present disclosure.

The present disclosure relates to video processing and artificial intelligence and to a technique of searching for a video section by using natural language sentences. Before the present disclosure is described, a first method and a second method for video section search will be described.

Methods for searching for a specific section in video can be mainly classified into a first method and a second method. The first method searches for sections corresponding to pieces of predefined context information and may be performed, for example, by searching for a section in which a predefined object or face appears or a section which has a predefined attribute. On the other hand, the second method is a method of searching for a section corresponding to whatever sentence a user inputs for context information that is not predefined.

An embodiment of the present disclosure is directed to provide a method for searching for a video section based on natural language, which combines the first method and the second method in a complementary way so that context information is easy to input and accuracy is relatively high. Hereinafter, it will be described in detail with reference to drawings.

FIG. 1A is a flowchart illustrating a method for searching for a video section according to an embodiment of the present disclosure. A video section search method according to the present disclosure may include inputting a natural language sentence (111), extracting keywords (112), checking whether or not the keywords are included in predefined context information (113) and deriving a final search result (114). Hereinafter, a further detailed description will be presented with reference to FIG. 1B.

Figure 1B:
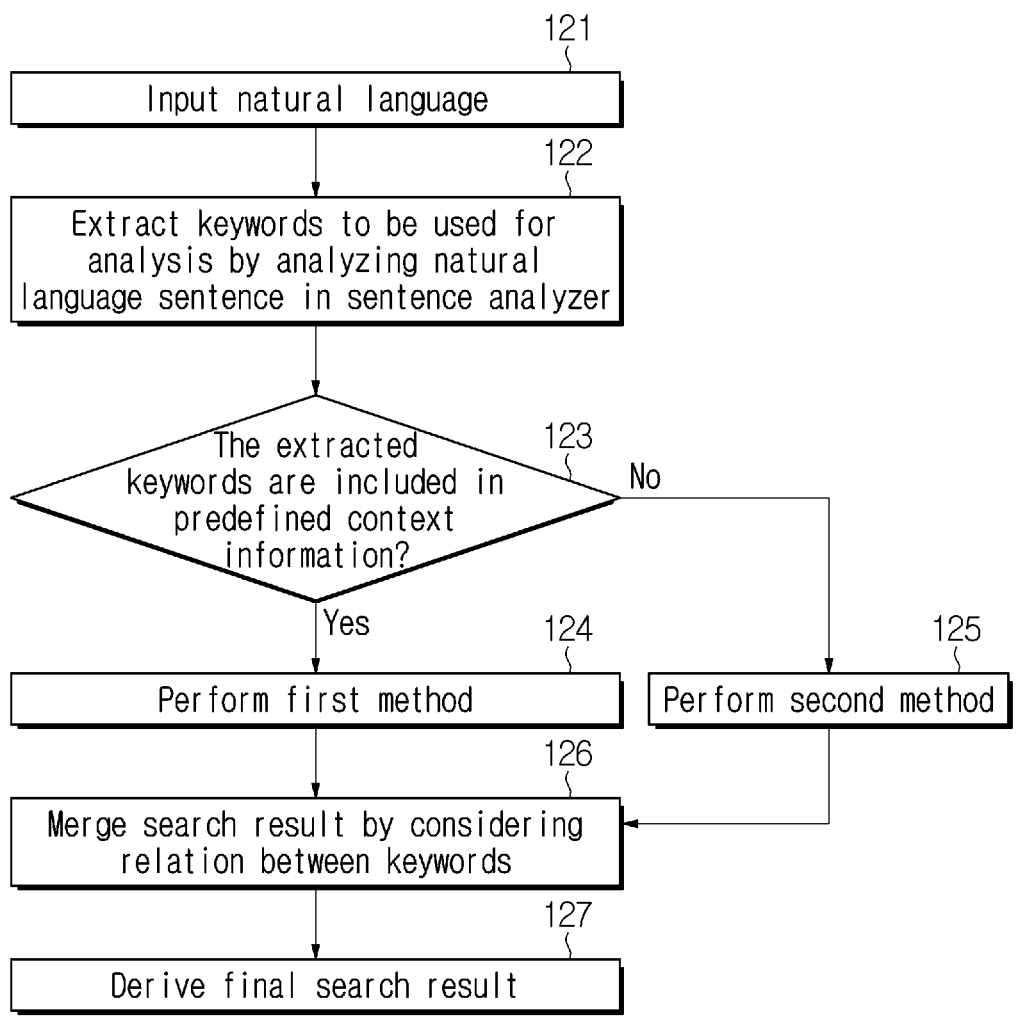

FIG. 1B is a view illustrating an embodiment of a video section search method flowchart according to the present disclosure. Specifically, FIG. 1B illustrates the flowchart of the video section search method in further detail. According to the embodiment of FIG. 1B, there may be: inputting a natural language (121); analyzing a natural language sentence in a sentence analyzer and extracting keywords to be used for analysis (122); checking whether or not the extracted keywords are included in predefined context information (123); performing a first method (124) when the extracted keywords are included in the predefined context information and performing a second method (125) when the extracted keywords are not included in the predefined context information; merging a search result by considering a relation between the keywords (126); and deriving a final search result (127).

More particularly, first, keywords to be used for analysis may be extracted by analyzing a natural language sentence in a sentence analyzer (122), and whether or not each of the keywords is included in predefined context information may be checked (123). The keywords may perform at least one of the first method, the second method or combination thereof described above. For example, a keyword included in predefined context information may be used to perform the first method, and a non-predefined keyword may be used to perform the second method. Herein, for a search model performing the first method, at least one artificial intelligence model may be used according to a type of context information, and after section searches are performed respectively, a final search result may be derived through a process of finally merging.

Figure 2:
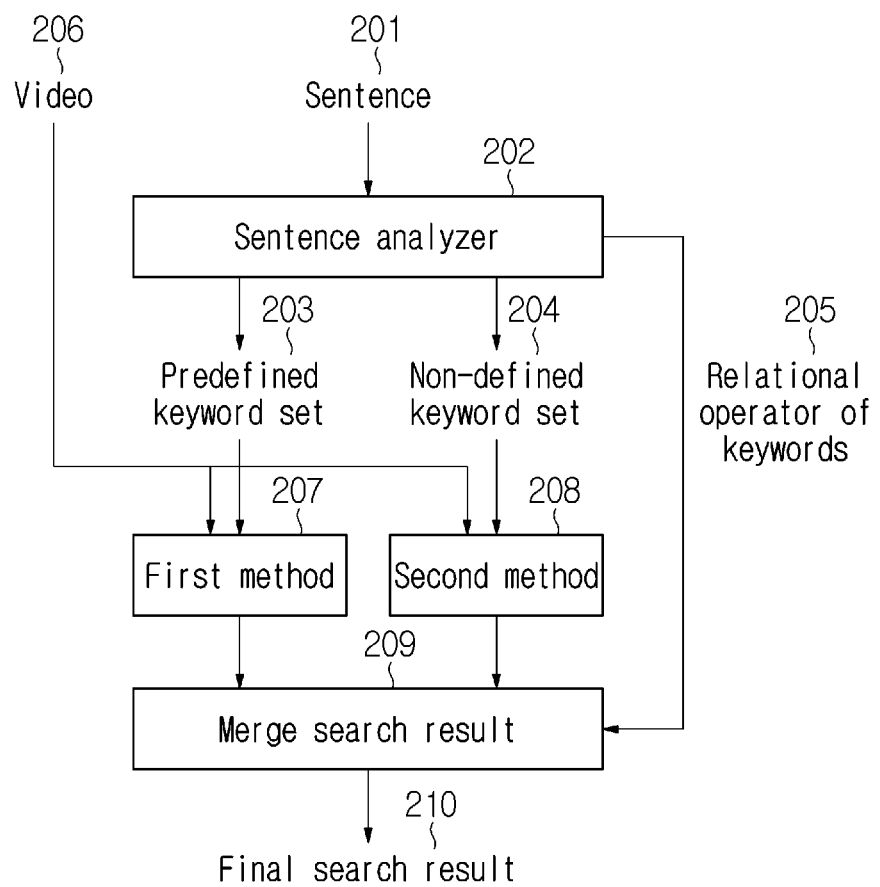
FIG. 2 is a block diagram illustrating a method for searching for a video section by using natural language according to an embodiment of the present disclosure.

FIG. 2 is a block diagram illustrating a method for searching for a video section by using natural language according to an embodiment of the present disclosure. Specifically, when a natural language sentence 201 is input into a sentence analyzer 202, a keyword within the input sentence may be extracted by the sentence analyzer 202, and then whether the keywords correspond to a predefined keyword set 203 or a non-defined keyword set 204 may be determined.

In case the keywords correspond to the predefined keyword set 203, the above-described first method 207 may be performed together with an input video 206, and in case the keywords are a non-defined keyword set 204, the above-described second method 208 may be performed together with the input video 206. That is, the present disclosure does not use and perform only one of the first method and the second method but selects and performs any one of the above-described two methods according to whether or not each keyword is included in predefined context information, so that not only advantages of the first method but also those of the second method may be taken.

In addition, the sentence analyzer 202 may also extract a relational operator 205 of a keyword that is extracted through the sentence analyzer 202. Each search result may be merged (209) by using a result of performing the first method 207 or the second method 208 and the relational operator of keyword 205. Herein, in the process (209) of merging a search result, merging may be performed by considering the relational operator of keyword 205. Thus, a final search result 210 may be derived. This will be described in detail in FIG. 4 to FIG. 5C below.

Figure 3A:
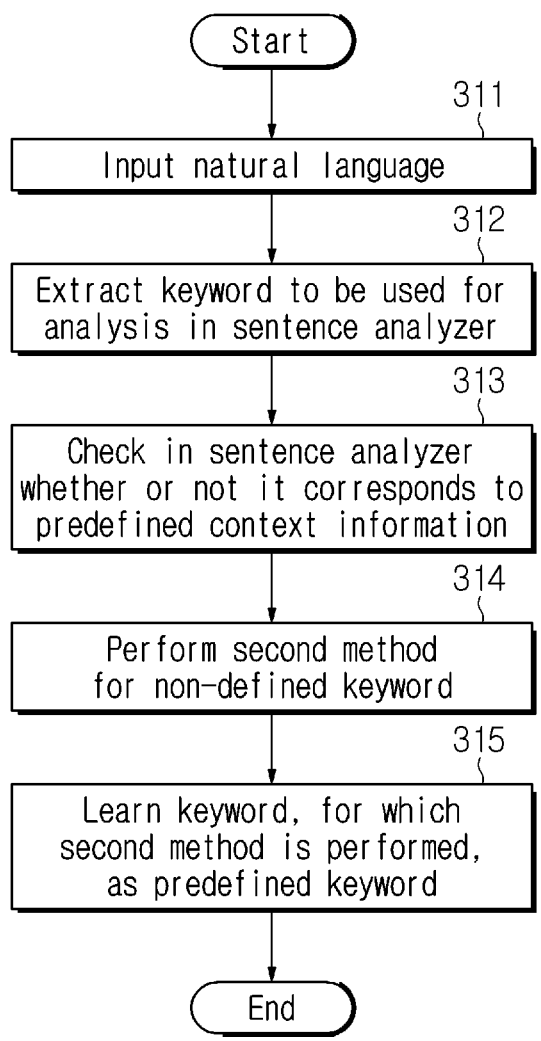
FIG. 3A is a flowchart illustrating a method for searching for a video section by using natural language according to a second embodiment of the present disclosure.

FIG. 3A is a flowchart illustrating a method for searching for a video section by using natural language according to a second embodiment of the present disclosure. For example, the above-described second method may be performed for a non-predefined keyword, and the keyword may be modified to a predefined keyword through an artificial intelligence learning model. After being modified to the predefined keyword, when the keyword is input again, it may be classified as a predefined keyword and a search using the first method is possible.

For example, a method for searching for a video section by using natural language may include: inputting a natural language (311); extracting a keyword to be used in a sentence analyzer (312): determining, in the sentence analyzer, whether or not the keyword corresponds to predefined context information (313); performing a second method for a non-defined keyword (314); and learning the keyword, for which the second method is performed, as a predefined keyword (315). Herein, after the step for learning the keyword (315) for the second method is completed, the learned keyword may be added into the predefined context information (or predefined keyword set). For example, the step for learning the keyword (315) for the second method is performed by an artificial intelligence machine learning.

More particularly, when a natural language is input into a sentence analyzer (311), a keyword to be used for analysis in a sentence analyzer is extracted (312), and then whether or not the keyword corresponds to predefined context information is determined (313). In case the keyword does not correspond to a predefined keyword, a second method is performed (314). In addition, in order to perform a first method not the second method when the keyword for which the second method is performed is input into the sentence analyzer again, learning the keyword, for which the second method is performed, as a predefined keyword may further be included (315). Accordingly, when the same keyword, for which the second method is already performed, is input into a sentence analyzer, since the keyword is included in a predefined keyword set, the first method may be performed.

Figure 3B:
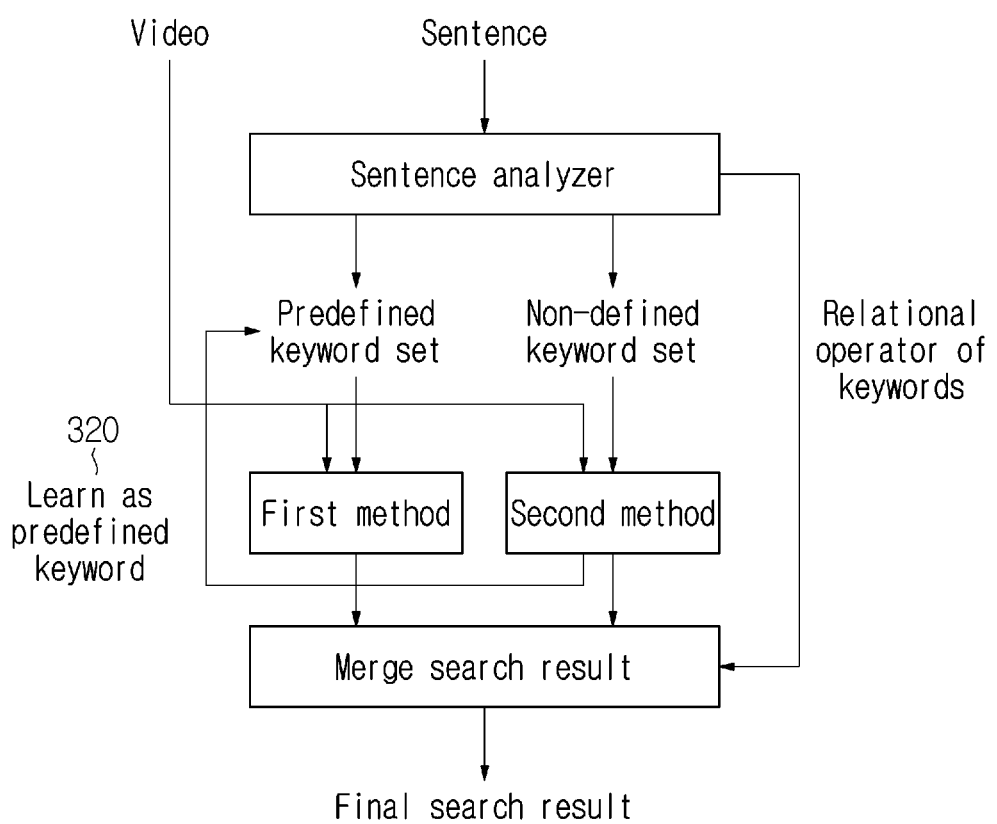
FIG. 3B is a block diagram illustrating a method for searching for a video section by using natural language according to a second embodiment of the present disclosure.

FIG. 3B is a block diagram illustrating a method for searching for a video section by using natural language according to an embodiment of the present disclosure.

Specifically, for a non-defined keyword for which the second method is performed, learning as a predefined keyword may be possible so that the non-defined keyword may be included in a predefined keyword set (320). For example, a learning method using artificial intelligence machine learning may be the method 320 for learning as a predefined keyword. However, an embodiment of the present disclosure does not limit a learning method to the above example.

Figure 4:
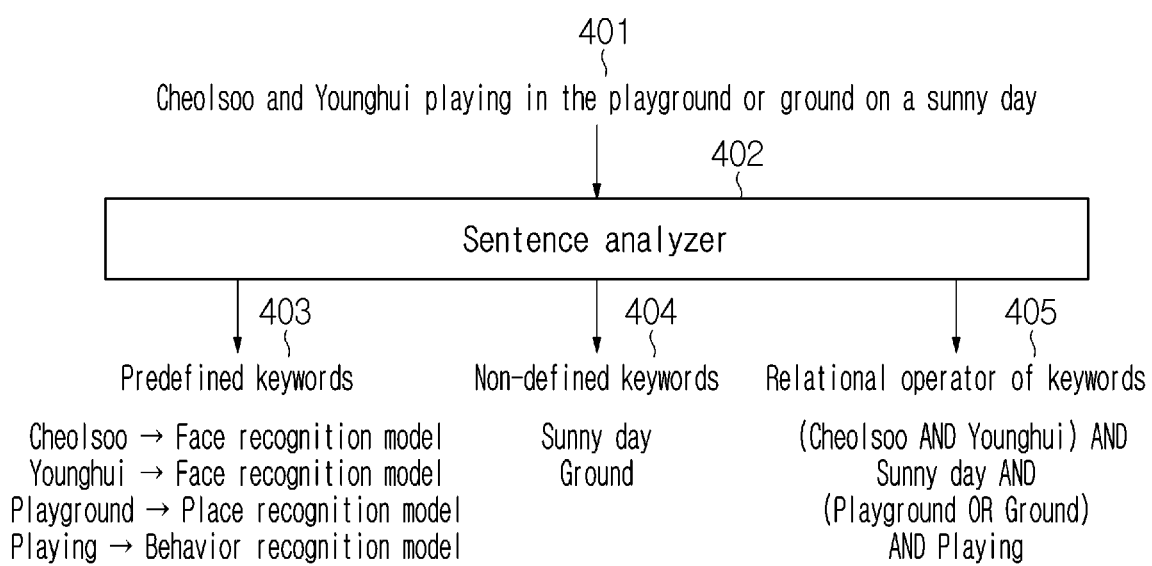
FIG. 4 is a view illustrating an example of a sentence analyzer according to an embodiment of the present disclosure.

FIG. 4 illustrates an example of extracting a keyword and a relational operator of keyword by a sentence analyzer according to the present disclosure.

When a user inputs a natural language sentence (e.g., 'Cheolsoo and Younghui playing in the playground or ground on a sunny day') into a sentence analyzer 402, it is possible to determine whether or not each keyword of the input sentence belongs to predefined context information. Herein 'Cheolsoo' and 'Younghui' represent a first name of Korean person, as like 'David' or 'Julia' of American person. In case the keyword belongs to the predefined context information, it is also possible to derive which predefined model it belongs. In addition, by deriving a relational operation of keywords appearing in the sentence, a method of merging detection results of each model may be determined.

Specifically, the predefined context information may mean a keyword which is directly determined by the user or a system. That is, for example, a video section search device according to the present disclosure may classify a specific keyword as a predefined keyword through a pre-learned artificial intelligence learning model. On the other hand, according to another embodiment, the predefined context information may be defined by an external organization (e.g., a server that operates a database) that provides videos. In this regard, the external database may be a local database via a wired hardware link. In addition, the database may be a remote database accessible through an internal private network or an outbound network or be a cloud-based database, but the present disclosure is not limited thereto.

In addition, the predefined context information may include not only a keyword perfectly matching a predefined keyword but also a keyword that is very similar to the predefined keyword. For example, an English expression of a specific Korean word may be defined as a similar keyword. Specifically, when 'Playground' is included as a predefined keyword in the sentence analyzer, even if a user inputs 'playground' in the sentence analyzer, it may be recognized as predefined context information so that a first method may be performed. In addition, the keyword 'football', 'soccer' and the like may be classified as similar keywords.

A method of analyzing a natural language sentence in the sentence analyzer 402 may be described as follows. For example, when a natural language sentence Cheolsoo and Younghui playing in the playground or ground on a sunny day' 401 is input, the sentence analyzer 402 may extract keywords of the input sentence. 'Cheolsoo', Younghui 'Sunny day', 'Playground', 'Ground' and 'Playing' may be keywords that are extracted by the sentence analyzer. After the keywords are extracted, it may be determined whether or not the extracted keywords belong to predefined context information. For example, when the keywords 'Cheolsoo', Younghui 'Playground' and 'Playing' belong to predefined context information, the keywords may be classified as a predefined keyword 403. On the other hand, the remaining keywords 'Sunny day' and 'Ground', which do not belong to the predefined context information, may be classified as a non-defined keyword 404.

The sentence analyzer 402 may determine which predefined learning model the keywords classified as the predefined keyword 403 correspond to. For example, 'Cheolsoo' and 'Younghui' may be determined by a face recognition model, and 'Playground' may be determined by a place recognition model. In addition, 'Playing' may be determined by an action recognition model. Thus, the sentence analyzer 402 may also derive a predefined model to which predefined keywords correspond. Each predefined model may be enabled when context information belonging to the each model is given, and enabled models may respectively derive a section search result from a video.

In addition, the sentence analyzer 402 may extract a relational operator 405 of keywords as AND or OR. For example, through the input natural language sentence, the 'Cheolsoo' and the 'Younghui' may be analyzed as 'Cheolsoo' AND 'Younghui', and a relational operator may be derived so that the 'playground or ground' becomes 'Playground' OR 'Ground'. Consequently, when the method is applied to the whole input sentence, relational operators between keywords like '(Cheolsoo AND Younghui) AND (Sunny day) AND (Playground OR Ground) AND (Playing)' may be derived.

That is, according to the embodiment of FIG. 4, the above-described first method may be performed for keywords that are classified as the predefined keyword 403. On the other hand, the above-described second method may be performed for keywords that are classified as the non-defined keyword 404. In addition, a relational operator of keyword may be determined based on an input natural language sentence. The search result may be merged by considering the keyword search result and relational operators of keywords, and a final search result may be derived. A method of deriving the final search result will be described in detail with reference to FIG. 5A to FIG. 5C.

Figure 5A:
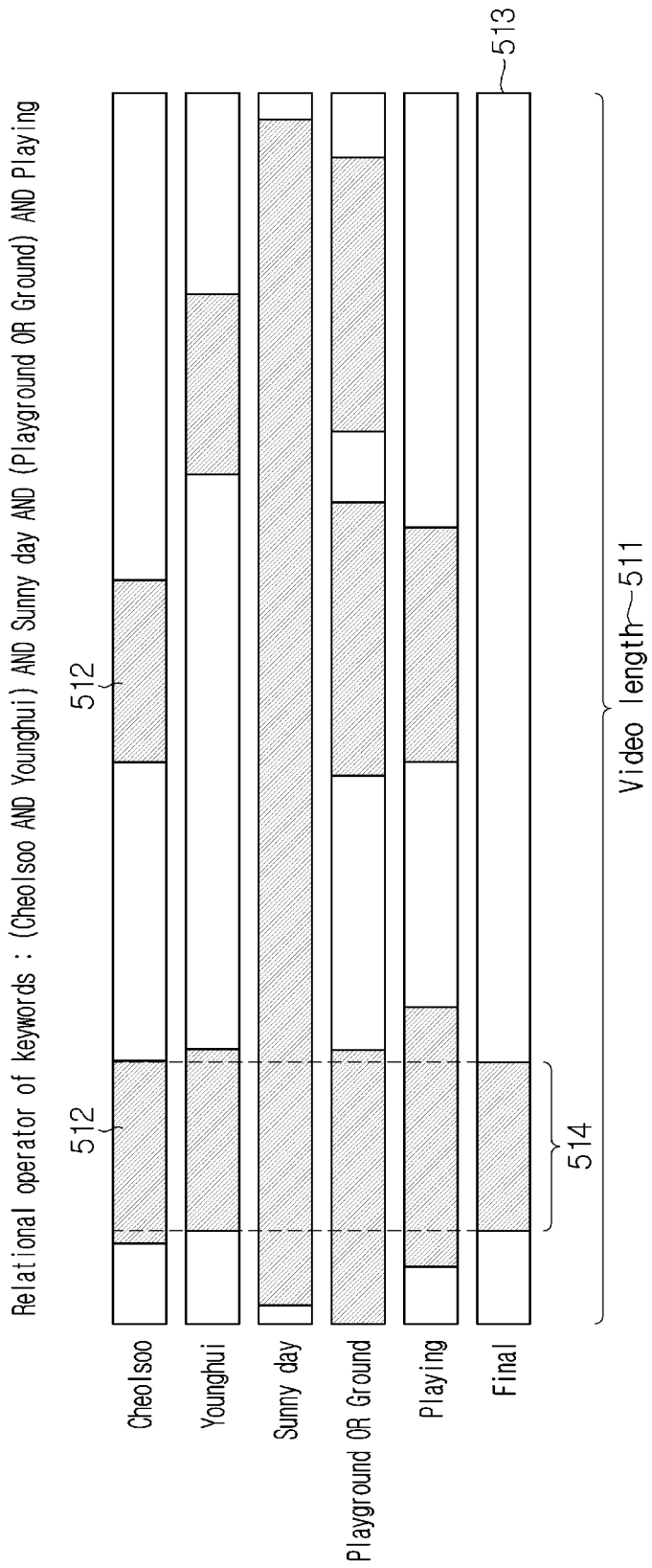
FIG. 5A is a view illustrating a search result according to a detection result for each keyword and a relational operator in accordance with an embodiment of the present disclosure.

FIG. 5A is a view illustrating an embodiment of a search result according to a detection result for each keyword and a relational operator in accordance with the present disclosure. FIG. 5A will be described using the example sentence 401 used in FIG. 4 described above.

In order to merge a search result derived from each model, the result may be merged according to a relation determined in a sentence analyzer, as shown in FIG. 5A. The horizontal axis of FIG. 5A may mean a whole video length 511. A shaded part 512 in the whole video length 511 may be a part of video in which a corresponding keyword is present. The part in which the keyword is present may be determined by a first method or a second method.

In order to merge the keyword search result, a relation of the keywords may be considered. For example, 'Cheolsoo', 'Younghui', 'Sunny day', 'Playground or Ground' and 'Playing' are all connected by the relational operator 'AND'. However, 'Playground' and 'Ground' are connected by the relational operator 'OR'. When the search result is merged by considering those relational operators, a section 514 including all the keywords may be derived in FIG. 5A. Thus, a final search result 514 may be provided to a user.

Figure 5B:
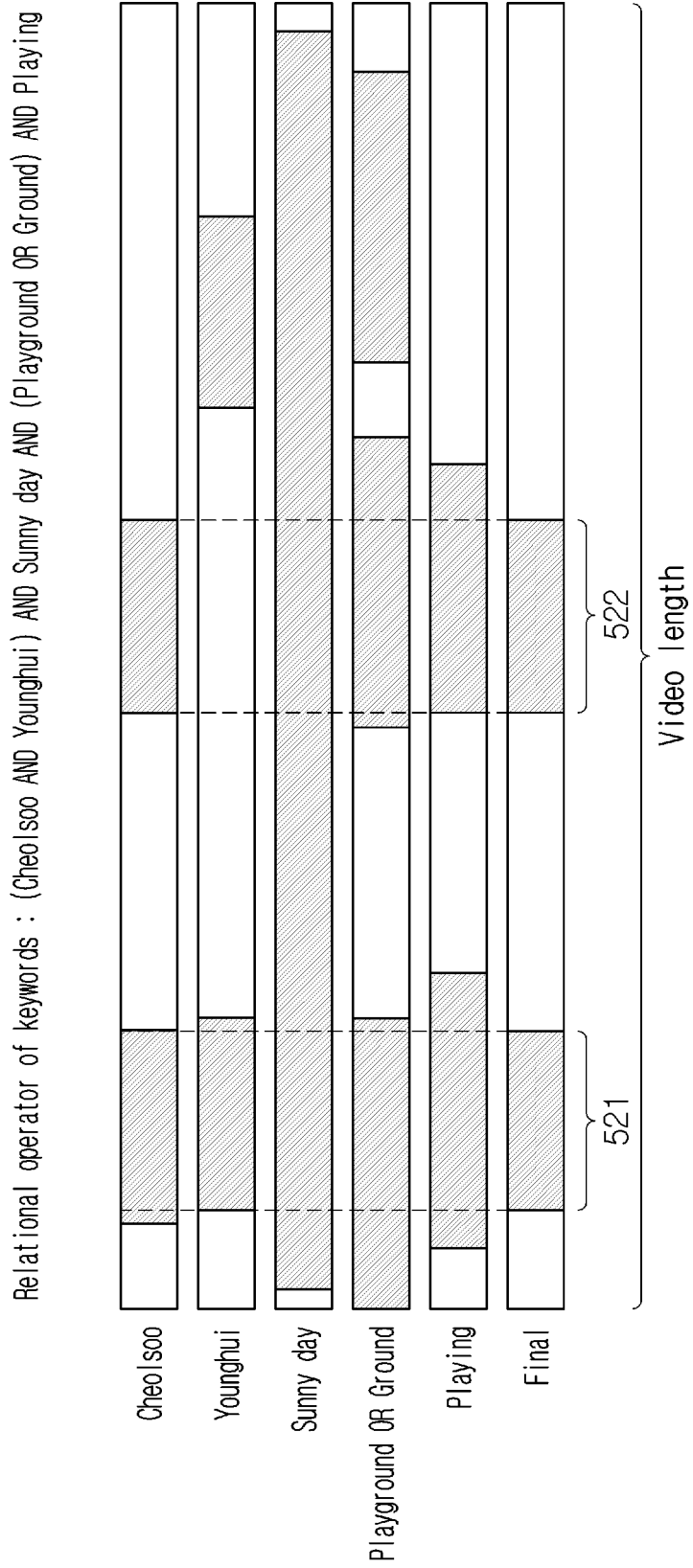
FIG. 5B is a view illustrating a detection result for each keyword and a priority order based on the accuracy of detection results in accordance with an embodiment of the present disclosure.

FIG. 5B is an example illustrating a detection result for each keyword and a priority order based on the accuracy of detection results in accordance with the present disclosure.

Specifically, when deriving the search result, it is also possible to derive a search result by prioritizing in order of accuracy. Referring to FIG. 5B, the part 521 including all the keywords may have the first priority to derive a search result. However, there may be a section 522 in which, among the keywords, the keyword 'Younghui' is not present but all the remaining keywords are present. The section 522 has lower accuracy than the section 521 but may have the second priority in providing a search result. That is, the section 521 provides a first-priority search result and the section 522 provides a second-priority search result so that a plurality of video sections may be provided according to a priority order. Accordingly, it is an advantage that a similar section to a scene desired by a user may be provided in various ways.

Figure 5C:
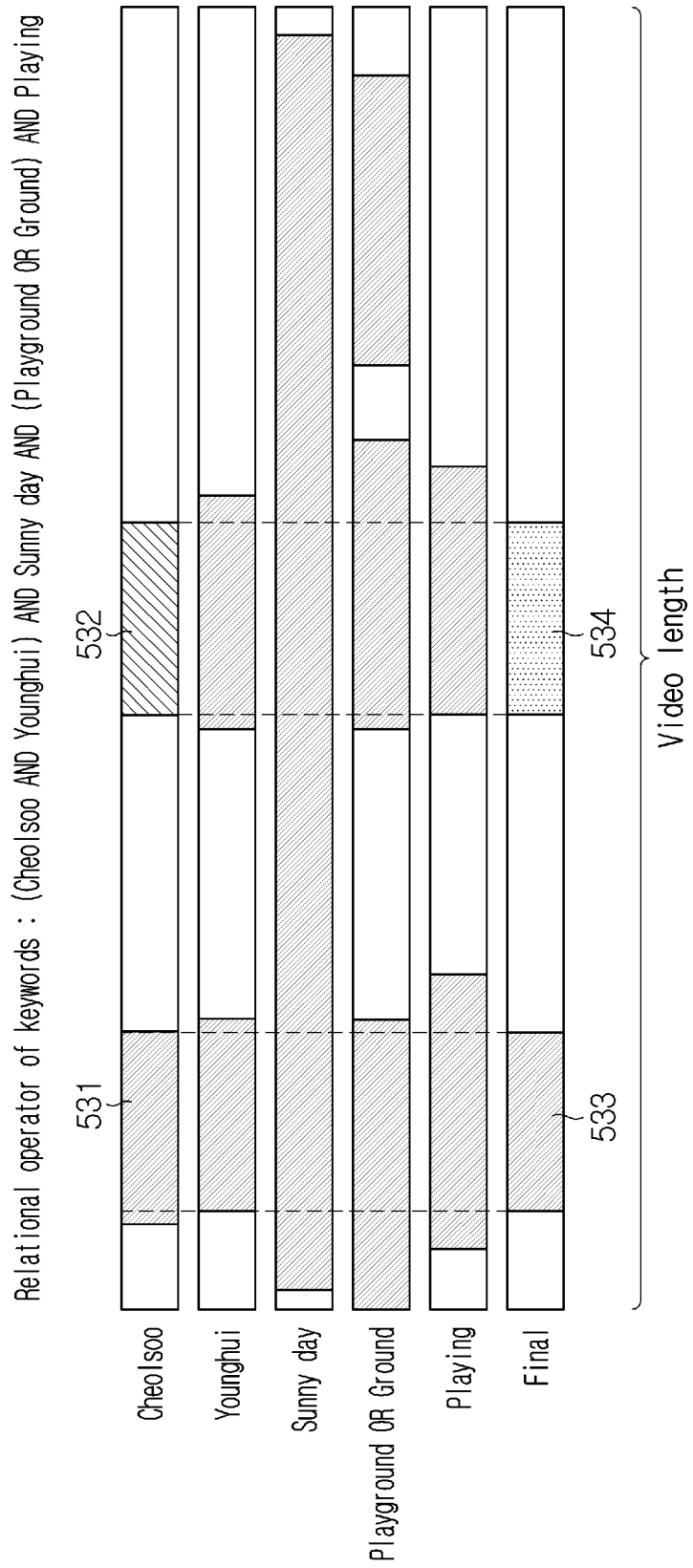
FIG. 5C is a view illustrating a detection result for each keyword and the accuracy of detection results in accordance with an embodiment of the present disclosure.

FIG. 5C is an example illustrating a detection result for each keyword and the accuracy of detection results in accordance with the present disclosure.

Specifically, when searching for a video section in which the keyword is present, accuracy may be considered. For example, it is possible to search the whole video length for a section 531 in which the keyword 'Cheolsoo' is present at 100 percent. For example, this may be a case in which only the character named 'Cheolsoo' appears in the picture. On the other hand, it is also possible to search for a section 532 in which the keyword 'Cheolsoo' is present not at 100 percent but with an accuracy lower than 100 percent. For example, the section 532 may correspond to a case in which the face of 'Cheolsoo' is so small or appears partially in the picture or a case in which uncertainty is high due to video quality or other problems. Such accuracy may be reflected in a whole search result, and a search result may be finally provided by considering priorities according to each accuracy. In the case of FIG. 5C, as for the final search results of the section 533 and the section 534, the section 533 with higher accuracy of 'Cheolsoo' may have a higher priority than the section 534.

On the other hand, in case not only the character 'Cheolsoo' but also other characters are shown in a picture (e.g., a picture in which 'Cheolsoo' and another person (ex., 'Gildong') are shown together), the keyword 'Cheolsoo' and the keyword 'Gildong' may be determined with 100 percent accuracy, respectively. However, according to a system design, a user's search efficiency may be further enhanced by setting such a picture showing multiple characters in distinction from a picture showing only one character (e.g., a search by 'picture showing Cheolsoo alone' is possible).

In addition, based on the present disclosure, automatic collection, summarizing and editing systems through video section search based on natural language may be configured. For example, when a user inputs a natural language sentence that the user wants, video section search results may be automatically collected and stored using the natural language sentence. In addition, the video sections thus collected may be summarized and provided in order of accuracy. In addition, through a video section search according to the present disclosure, the video sections may be edited either comprehensively or individually. However, the above description is merely a particular example intended to enhance understanding of an embodiment of the present disclosure, and it is apparent that many other application methods may exist.

Figure 6A:
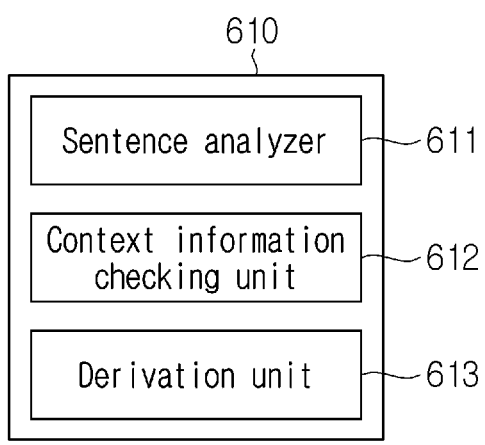
FIG. 6A and FIG. 6B are views illustrating configurations of video section search devices according to an embodiment of the present disclosure.

FIG. 6A is a view illustrating a configuration of a video section search device according to the present disclosure. A video section search device 610 according to an embodiment of the present disclosure may include a sentence analyzer 610, a context information checking unit 620, and a derivation unit 630. According to an embodiment of the present disclosure, when a natural language sentence is input, the sentence analyzer 610 may analyze the natural language sentence and extract keywords to be used for analysis. In addition, the context information checking unit 620 may check whether or not the keywords extracted in the sentence analyzer are included in predefined context information. In addition, the derivation unit 630 may derive a final search result through a process of finally merging after the derivation unit 630 performs a section search for each keyword separately.

Figure 6B:
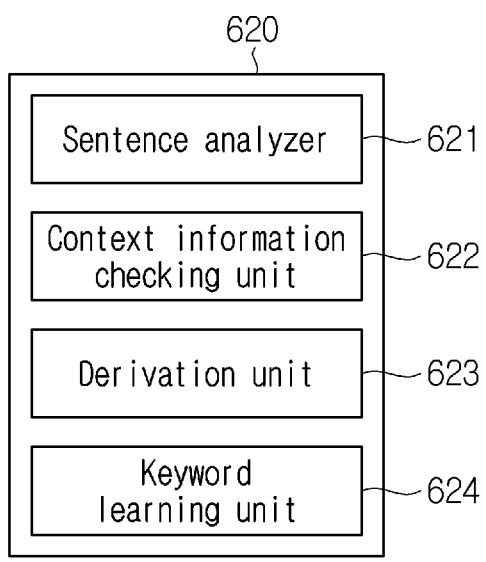

FIG. 6B is a view illustrating another embodiment of a configuration of a video section search device according to the present disclosure. A video section search device 620 according to the embodiment of FIG. 6B may include a sentence analyzer 621, a context information checking unit 622, a derivation unit 623, and a keyword learning unit 624. The keyword learning unit 624 may learn a non-defined keyword, which is performed by the second method, as a predefined keyword through an artificial intelligence learning model. That is, when a non-predefined keyword is initially input, the second method is performed for the keyword, but when the keyword is input again, it may be classified as a predefined keyword so that the first method may be performed.

In this regard, for convenience of explanation, an overlapping part is excluded from the disclosure of FIG. 6A and FIG. 6B, but the device of FIG. 6A and FIG. 6B may include all the above-described contents of FIG. 1A to FIG. 5C.

Figure 7:
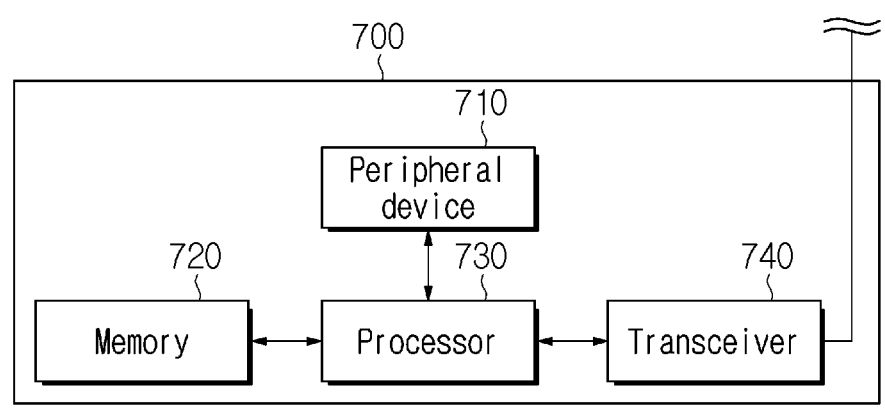
FIG. 7 is a view illustrating a configuration of a device to which a video section search device according to an embodiment of the present disclosure is applicable.

FIG. 7 illustrates a configuration of a device to which a video section search device of the present disclosure is applicable. Referring to FIG. 7, a device 700 may include a memory 720, a processor 730, a transceiver 740, and a peripheral device 710. In addition, as an example, the device 700 may further include another configuration and is not limited to the above-described embodiment. As an example, the device 700 may be the above-described video section search device. For example, the device 700 may be a smartphone, a laptop computer, a personal mobile device, a wearable device, a PC, a desktop computer, and the like.

More specifically, the device 700 of FIG. 7 may be example hardware/software that performs a video section search using a natural language. Herein, as an example, the memory 720 may be a non-removable memory or a removable memory. For example, when a video to be searched is present within a device, the memory 720 may be a database or storage means that stores the video. In addition, the memory 720 may be a storage means that stores the above-described artificial intelligence learning model.

In addition, as an example, the peripheral device 710 may include a display, a GPS, a user interface or other peripherals and is not limited to the above-described embodiment. For example, through a display screen that provides a user interface, the above-described natural language sentence may be received as an input from a user.

In addition, as an example, like the transceiver 604, the above-described device 700 may include a communication circuit. Based on this, the device 700 may perform communication with an external device. For example, when a video to be searched is present in an external network (e.g., an external cloud or application server), the video may be received via communication to the network through the transceiver 640.

In order to implement a flowchart of the above-described method for searching for a video section according to the present disclosure (e.g., FIG. 1A to FIG. 5C), the processor 730 may execute commands stored in the memory 720. As an example, the processor 730 may control at least any one operation among signal coding, data processing, power controlling, input and output processing, and communication operation. In addition, the processor 730 may control a physical layer, an MAC layer and an application layer of the device 700. In addition, as an example, the processor 730 may execute an authentication and security procedure in an access layer and/or an application layer but is not limited to the above-described embodiment.

In addition, as an example, the processor 730 may be at least one of a general-purpose processor, a digital signal processor (DSP), a DSP core, a controller, a micro controller, application specific integrated circuits (ASICs), field programmable gate array (FPGA) circuits, any other type of integrated circuit (IC), and one or more microprocessors related to a state machine. In other words, it may be a hardware/software configuration playing a controlling role for controlling the above-described device 700.

The various embodiments of the disclosure are not intended to be all-inclusive and are intended to illustrate representative aspects of the disclosure, and the features described in the various embodiments may be applied independently or in a combination of two or more.

In addition, the various embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays A general processor, a controller, a microcontroller, a microprocessor, and the like may be used for implementation. For example, it is apparent that the present disclosure may be implemented by a type of program stored in a non-transitory computer readable medium or be implemented by a type of program stored in a non-transitory computer-readable medium that may be used on an edge or a cloud. In addition, the present disclosure may also be implemented in various combinations of hardware and software.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer.

It will be apparent to those skilled in the art that various substitutions, modifications and changes are possible are possible without departing from the technical features of the present disclosure. It is therefore to be understood that the scope of the present disclosure is not limited to the above-described embodiments and the accompanying drawings.

What is claimed is:

1. A method for searching for a video section, the method comprising:
    extracting keywords and a relational operator between keywords from a natural language sentence when the natural language sentence is input, the keywords being for searching a video section;
    determining whether or not the extracted keywords are included in predefined context information;
    identifying first and second keywords among the extracted keywords, the first keyword being included in predefined context information, and the second keyword being not included in predefined context information;
    deriving a first search result by performing a first method on the first keyword, the first method being a method of searching a video section with predefined keyword, object, face, or attribute;
    deriving a second search result by performing a second method on the second keyword, the second method being a method of searching a video section corresponding to a sentence inputted by a user; and
    deriving a final search result by merging the first and second search results based on the relational operator, and providing the first search result to a user.

2. The method of claim 1, wherein the first method uses one or more artificial intelligence learning models according to a type of context information.

3. The method of claim 1, wherein, when the extracted keywords belong to predefined context information, a predefined model which the extracted keywords correspond to is determined.

4. The method of claim 3, wherein the predefined model is enabled when context information belonging to each model is given.

5. The method of claim 1, further comprising, when the second method is performed, learning a keyword, for which the second method is performed, as a predefined keyword.

6. The method of claim 5, wherein, when the learned keyword is input again, the first method is performed instead of the second method.

7. The method of claim 1, wherein the predefined keyword is a keyword that is stored as a predefined keyword in an internal memory.

8. The method of claim 1, wherein the predefined keyword is a keyword that is provided by an external device.

9. The method of claim 1, wherein the providing of the search result provides a search result by prioritizing search results in order of accuracy.

10. An apparatus for searching for a video section, the apparatus comprising:
    a memory; and
    a processor operatively coupled to the memory;
    wherein the processor is configured to:
    extract keywords and a relational operator between keywords from a natural language sentence when the natural language sentence is input, the keywords being for searching a video section;
    determine whether or not the extracted keywords are included in predefined context information;
    identify first and second keywords among the extracted keywords, the first keyword being included in predefined context information, and the second keyword being not included in predefined context information;
    derive a first search result by performing a first method on the first keyword, the first method being a method of searching a video section with predefined keyword, object, face or attribute,
    derive a second search result by performing a second method on the second keyword, the second method being a method of searching a video section corresponding to a sentence inputted by a user, and
    derive a final search result by merging the first and second search results based on the relational operator, and provide the first search result to a user.

11. The apparatus of claim 10, wherein the processor is further configured to enable a keyword, for which the second method is performed, to be learned as a predefined keyword, when the second method is performed.

12. The apparatus of claim 10, wherein the processor is further configured to derive a search result by prioritizing search results in order of accuracy.

* * * * *